United States Patent [19]

Janzen et al.

[11] Patent Number: 5,437,231
[45] Date of Patent: Aug. 1, 1995

[54] OVERHEAD CONVEYOR SYSTEM HAVING A PUSHER DEVICE WITH OVERLOAD AND BLOCKAGE PROTECTION

[75] Inventors: Paul Janzen; Winfried Suhling; Gerhard Schilling, all of Bielefeld, Germany

[73] Assignee: Dürkopp Adler Aktiengesellschaft, Germany

[21] Appl. No.: 168,845

[22] Filed: Dec. 17, 1993

[30] Foreign Application Priority Data

Dec. 24, 1992 [DE] Germany .................. 42 44 152.8

[51] Int. Cl.⁶ ............................................ B61B 3/00
[52] U.S. Cl. .................... 104/172.4; 104/162; 104/172.5; 198/719
[58] Field of Search ............... 104/162, 172.1, 172.4, 104/172.5; 198/465.4, 719

[56] References Cited

U.S. PATENT DOCUMENTS

| | | | |
|---|---|---|---|
| 4,073,237 | 2/1978 | Wakabayashi | 104/172.5 |
| 4,108,078 | 8/1978 | Kuwertz | 104/172.4 |
| 4,939,999 | 7/1990 | Burt et al. | 104/172.4 X |

FOREIGN PATENT DOCUMENTS

| | | | |
|---|---|---|---|
| 1163357 | 2/1964 | Germany | 104/172.5 |
| 4243728 | 8/1992 | Japan | 198/719 |

*Primary Examiner*—Robert J. Oberleitner
*Assistant Examiner*—S. Joseph Morano
*Attorney, Agent, or Firm*—Ostrolenk, Faber, Gerb & Soffen

[57] ABSTRACT

An overhead conveyor system with rolling conveyor carriages guided on rails. The pushers provided for moving the conveyor carriages out of the main track and onto a secondary track are provided with a claw which can be swung in a direction opposite to the direction of transport (T) into an upward-swung third position. In this position, a conveyor carriage which is blocked in the region of a switch and cannot be moved out of the track can be passed by the pusher without damage to the conveyor carriages or the overhead conveyor system. When the claw is swung upward, a flap is at the same time moved out laterally, which can serve as a signal for immediately stopping the conveyor system. The outwardly swung flap may assist maintenance personnel in finding the switch at which a conveyor carriage cannot be properly moved out of the line. The pusher includes a recess which is covered by a spring-loaded plate. The claw is fastened asymmetrically in the pusher so that it swings upward into the recess. The claw is urged into its lowest position by a spring above the plate. A force acting on the claw and swinging it into its third position causes the claw to move against the plate as the force becomes larger than the effective force of the spring.

11 Claims, 4 Drawing Sheets

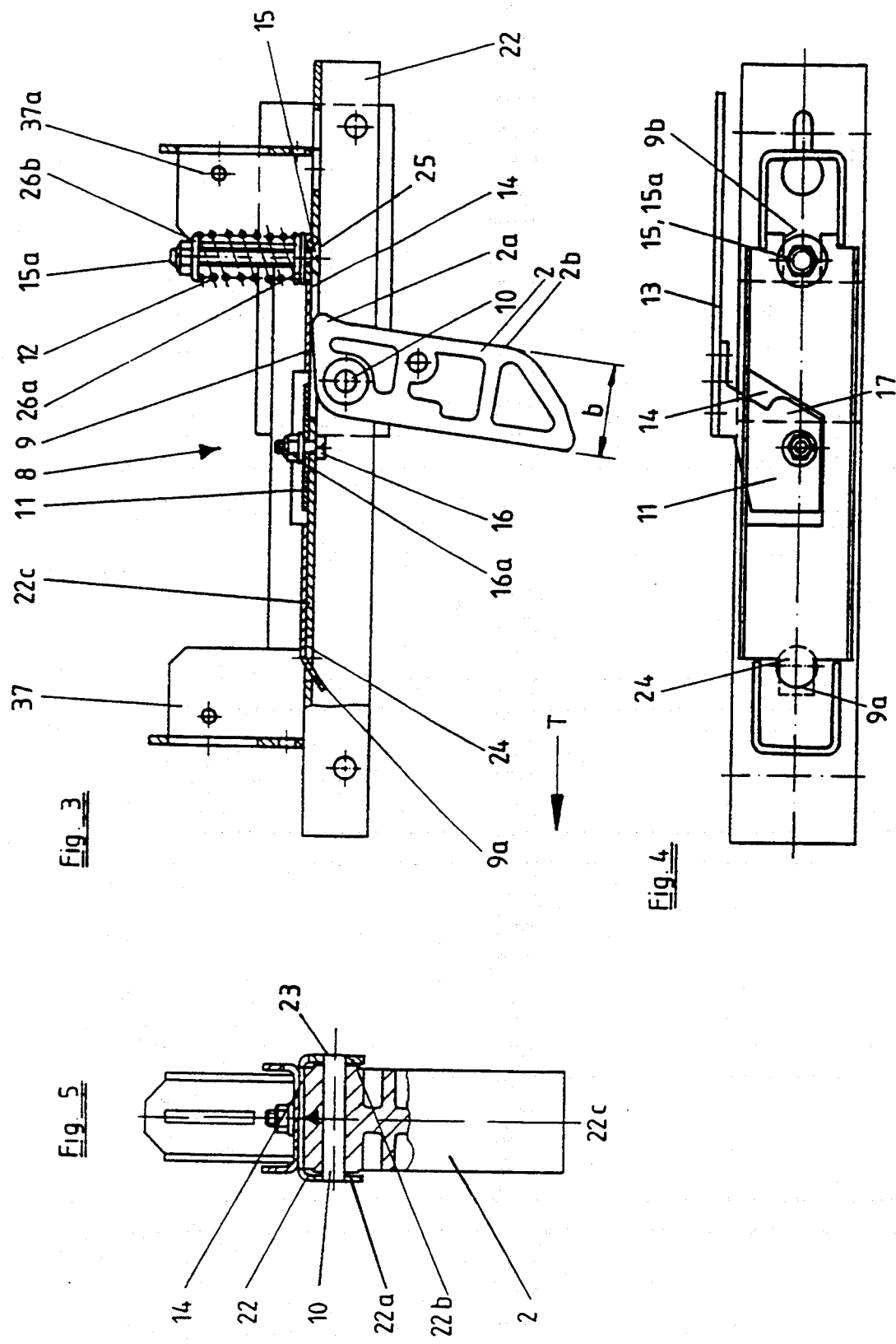

OVERHEAD CONVEYOR SYSTEM HAVING A PUSHER DEVICE WITH OVERLOAD AND BLOCKAGE PROTECTION

This application is related to a commonly assigned application filed on even date herewith and titled DRIVE ELEMENT FOR THE LOAD CARRIER OF AN OVERHEAD CONVEYOR SYSTEM (application Ser. No. 008/169,671), the disclosure of which is expressly incorporated by reference.

BACKGROUND OF THE INVENTION

The present invention relates to an overhead conveyor system.

In a known type of overhead conveyor system, rolling conveyor carriages are guided on rails, in particular for the transport of articles of clothing suspended from hangers. A conveyor line is formed by a runway rail and a drive chain which revolves horizontally endlessly above and parallel thereto, having at least one branch into another line. The conveyor carriages can be moved out of the line into a branch or secondary line by means of a pusher which is fastened to the conveyor chain and engages the back of each conveyor carriage, the pusher consisting of a carrier device and a claw which is fastened therein on a pin for swinging in a vertical plane. The claw has a first downward position (its active position) and a second position in which it is swung upward in the direction of transport (T).

In particular in the clothing industry, articles of clothing suspended from clothes hangers are hung, for purposes of filling orders or removal, on the carrier rod of single-track conveyor carriages, so-called trolleys, of an overhead conveyor system. Each of the trolleys, which travel on rails, is carried along by a driver which acts on the front track roller and is connected to a drive element which is fastened on the drive chain arranged above the runway rail.

Such an overhead conveyor system has different rail lines which are connected to each other by switches. At these switches, a trolley can be moved from the line it is on into a branching conveyor line. For this purpose, a pusher element is also fastened to the drive chain, arranged behind each trolley. When a trolley is removed from the line by a switch, the drive element comes out of engagement with the front track roller at the moment when said roller has left the rail line which it was in. The trolley then slows down and the pusher arranged behind the trolley, which continues to be driven with unchanged speed of revolution by the drive chain, engages the trolley's rear track roller which is still in the main conveyor line. In this way, the trolley continues to be pushed with its original speed into the new branch conveyor line.

In order for the trolley to be properly pushed out of the main like, the claw of the pusher must be rigid in the direction of transport. In order, however, to be able to introduce a trolley into the line between a pair of individual pushers, the claw is able to swing on the pusher in the direction of transport so that it can be lifted and passed by a trolley coming from the rear.

For this purpose, it is known to fasten the claw, which is made of plastic, to the pusher element by means of a pin which is passed horizontally and eccentrically through one end of the claw.

With the known equipment, there are two basic types of collision which can seriously interfere with the operation of the conveyor when a trolley is being removed from a main line into a branch line.

In the first case, after the switch has been passed over by the front track roller of the conveyor carriage, the switch may spring back, so that while the front roller has been removed from the line and placed in the new conveyor line, the rear roller has not been released from the line and so remains in the old conveyor line. Since the U-shaped carrier rods of the conveyor carriages are mounted turnably in the carrier brackets which receive the track rollers, the pusher continues to push the trolley which is now in transverse position until the parallel distance between the front roller and the rear roller has reached the length of the carrier rod. Further transport movement is not possible. If the conveyor chain is not then turned off, there will be a fracture of material.

In the second case, the conveyor carriage is properly removed from the main line but the new section of line, for whatever reason, is occupied and the trolley strikes against an obstacle. If the obstacle is so close to the main conveyor line that the trolley cannot enter completely into the new conveyor line, it cannot be transported further by the pusher. In this case also there will inevitably be a fracture of material if the drive is not shut off immediately.

SUMMARY OF THE INVENTION

The object of the invention is therefore to improve the known overhead conveyor system so that, in the event of a blockage when a trolley is being moved out of the main track, damage to the conveyor system or its individual parts is effectively prevented.

This object may be achieved in an overhead conveyor system of this type by providing the claw in the pushing device with a third position in which it is swung up in a direction opposite the direction of transport (T) and away from the main track.

By providing the claw of the pusher device with a third, upward-swung position opposite to the direction of transport, the claw can be swung away from the main track directly by the trolley which is being prevented from traveling further, and the pusher device can thereby pass by the blocked trolley. If the claw swings into the third position against the force of a spring, it is assured by suitable selection of the spring, that the claw will swing away only upon encountering a substantial force such as can be produced only by a blocked trolley.

Advantageously the pusher device may include a mechanical device such as a flap which can be brought by the claw, when it is swung into the third position, from an inactive position into an active position, and in the active position, the mechanical device visibly indicating the fact that the claw has been swung into the third position.

The mechanical device makes it possible for the operator to note directly the place at which problems have arisen upon the movement of the trolley out of the line. Furthermore, an emergency disconnect switch can be actuated by the mechanical device or outwardly swung flap so that the conveyor system can be stopped immediately upon a blockage. The outwardly swung flap then serves to assist maintenance personnel to easily note the defective switch.

Another advantageous feature may be an optical monitoring device which is set up parallel to the conveyor line for detecting an outwardly swung flap. If an optical monitoring device is set up in the vicinity of the switch parallel to the conveyor line so that the outwardly swung flap of a pusher device interrupts the beam of light of the monitoring device, an automatic signal can be given to the control unit of the conveyor system, which signal can be used to stop the drive chain.

Other features and advantages of the present invention will become apparent from the following description of the invention which refers to the accompanying drawings.

BRIEF DESCRIPTION OF THE DRAWINGS

FIG. 3 is a partial sectional view of the pusher;

FIG. 4 is a top view of the pusher shown in FIG. 3;

FIG. 5 is a side view of the pusher shown in FIG. 3;

DETAILED DESCRIPTION OF AN EMBODIMENT OF THE INVENTION

Figure 1:
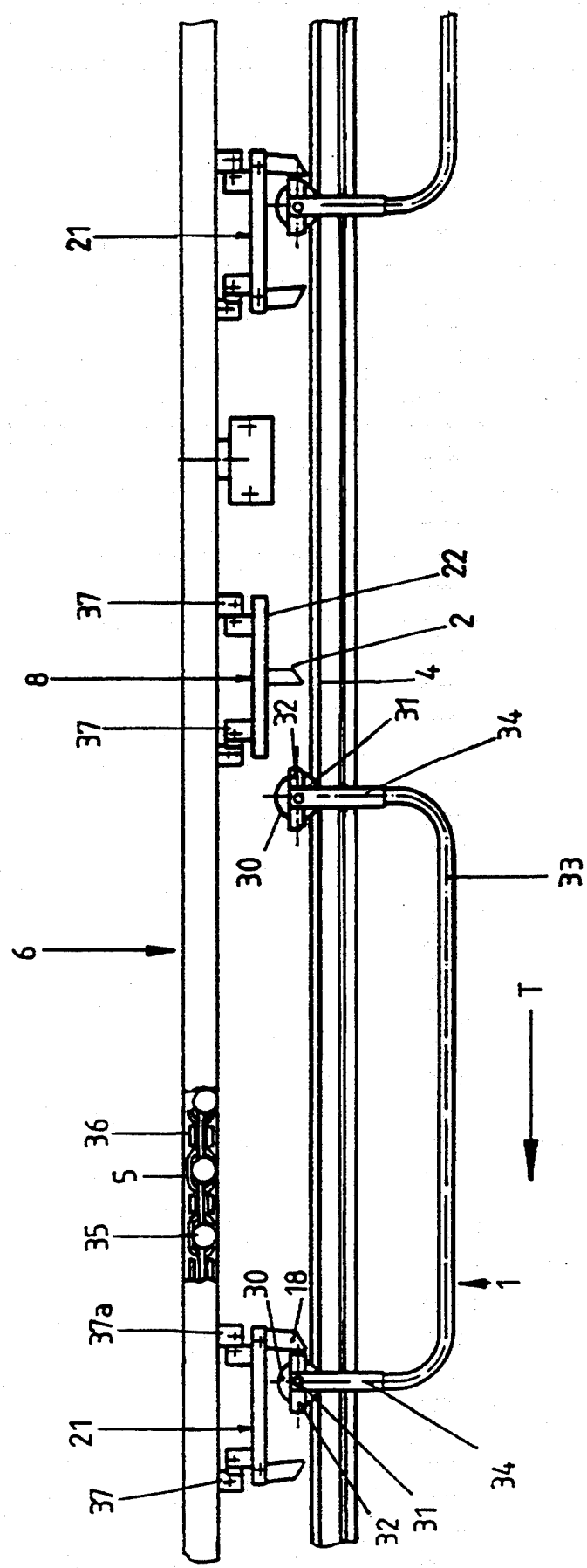
FIG. 1 is an schematic view of a segment of an overhead conveyor system.

FIG. 1 shows the overall construction of an overhead conveyor system.

The conveyor carriages 1 include a carrier rod 33, which is bent into a U-shape and is mounted turnably at both its ends in track-roller supports 34. Each track-roller support 34 supports a shaft 31 of a front or rear track roller 30. Around the track roller there is provided a bumper cap 32 for being acted upon by the driver 18, made preferably of plastic, of the drive element 21. Track-roller supports 34, track rollers 30 and bumper caps 32 are identical for the front and rear ends of the conveyor carriage 1 and therefore are provided with the same reference numerals in the drawings.

The overhead conveyor system includes a chain channel 6 with a drive chain 5 revolving therein continuously, driven by a gear motor (not shown in detail), and a runway rail 4, the profile of which is not further shown. The track rollers 30 are provided with a concentric circumferential groove (not shown) so that, in known manner, they roll guided on the profile of the runway rail 4. Runway rail 4, drive chain 5, and chain channel 6 form the conveyor line. The drive chain 5 which is driven in continuous revolution by a motor M (FIG. 2) is three-dimensionally articulate so that both ascending and descending paths can be moved over by the conveyor carriage 1 and the conveyor line can also assume an arcuate path. The drive chain 5 is guided in the chain channel 6 by carrier and support rollers 35, 36. A drive element 21 or a pusher 8 is fastened to the drive chain 5 in each case in the region of two adjacent carrier rollers 35 on carrier brackets 37 which protrude downward from the chain channel 6. Drive element 21 and pusher 8 are connected in turn with the drive chain 5. The driver 18 which is provided on the drive element 21 acts on the bumper cap 32 of the front track roller 30 of the conveyor carriage 1, as seen with reference to the direction of transport T, and pushes it with the speed of the revolving drive chain 5.

The pusher 8 is arranged at a horizontal distance behind the rear track roller 30 of the conveyor carriage 1. The pusher 8 (FIG. 3) has a claw 2 which is swingably mounted around a pin 10, a carrier element 22, a plate 9 which is mounted on the carrier element 22 for swinging against the force of the spring 12, and a plate 11 which can be swung outward by the upward swinging claw 2 and on which a flap 13 (FIG. 4) is fastened.

The carrier element 22 has a profile of U-shaped cross section (FIG. 5). The claw is swingably supported via the pin 10 in a bore 23 provided between side cheeks 22a, 22b. The rear surface 22c of the carrier element 22 is provided, above the claw 2, with a recess 14 which extends over the entire width. The length of the recess is somewhat greater than the width of the claw 2. The plate 9 is swingably fastened over the rear surface 22c of the pusher 8 between the front and rear carrier brackets 37, 37a. For this purpose, the plate 9 is provided on its front end with a downwardly bent tongue 9a which engages into a hole 24 which is provided in the rear surface 22c. The front end of the plate 9 is provided centrally with a slot 9b.

Behind the recess 14 (to the right in the figure), there is provided centrally, in the rear surface 22c, a bore hole 25 into which the one bolt 15 extends from below, engaging into the slot 9b of the plate 9. Over the plate 9 two disks 26a, 26b are provided on the bolt 15, receiving between them a compression spring 12 which is tensioned via a nut 15a threaded on the bolt 15. The plate 9 can be swung upward against the force of this compression spring 12. The axis of rotation is the tongue 9a.

Figure 7:
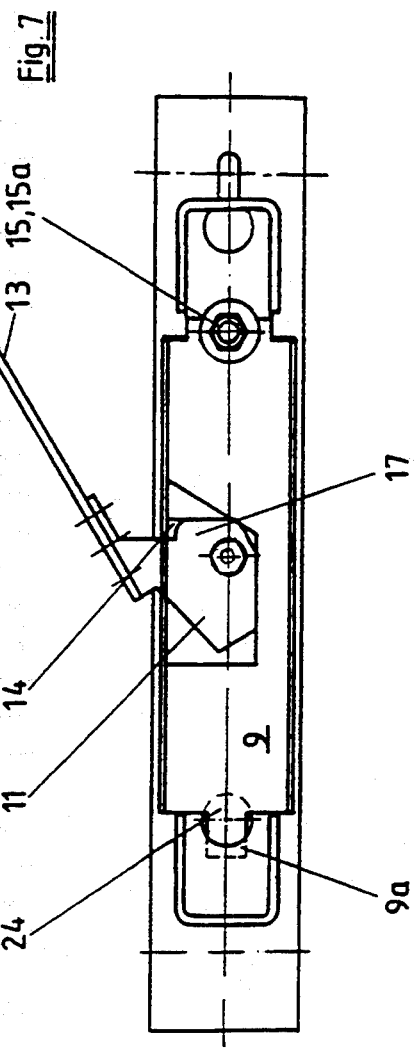
FIG. 7 shows the pusher of FIG. 4 with upward-swung claw.
Figure 8:
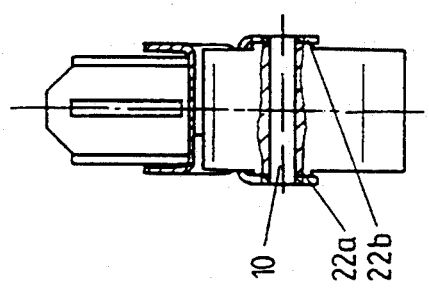
FIG. 8 shows the pusher of FIG. 5 with upward-swung claw.
Figure 9:
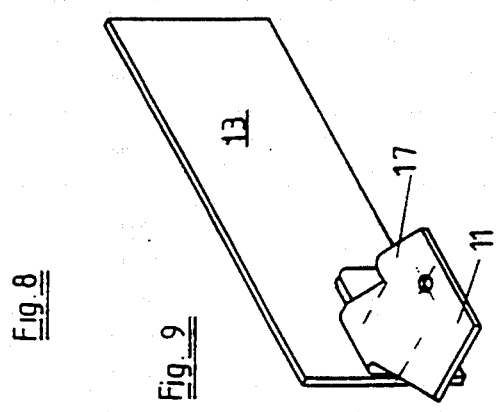
FIG. 9 is a perspective view of an individual part contained in FIG. 4.

In front of the recess 14 is the plate 11 bearing the flap 13, fastened in horizontally swingable manner via a bolt connection 16, 16a on the rear surface 22c of the carrier element 22. The plate 11 has the angular shape which can be noted from FIG. 7. On a horizontally engaging active side of the plate 11 there is developed a nose 17 which extends along the recess 14 in the applied position of the plate 11 and the flap 13 shown in FIG. 4.

The plate 9, acted on by the spring 12, presses against the claw 2 and by the eccentric pivoting of the claw 2 permits the swinging of the claw 2 in a direction opposite the direction of transport T. If the force acting on the claw 2 which exerts a moment directed in counterclockwise direction is greater than the pressing force of the spring 12 active on basis of the leverage, then the claw 2 swings in the direction opposite the direction of transport T and by its rear edge 2a presses the plate 9 upward. Upon this swinging motion, the claw 2 will come into engagement with, the nose 17 of the plate 11 and will swing the plate 11 - supported by the curved development of the nose 17 - and the flap 13 fastened to it in outward direction.

Figure 6:
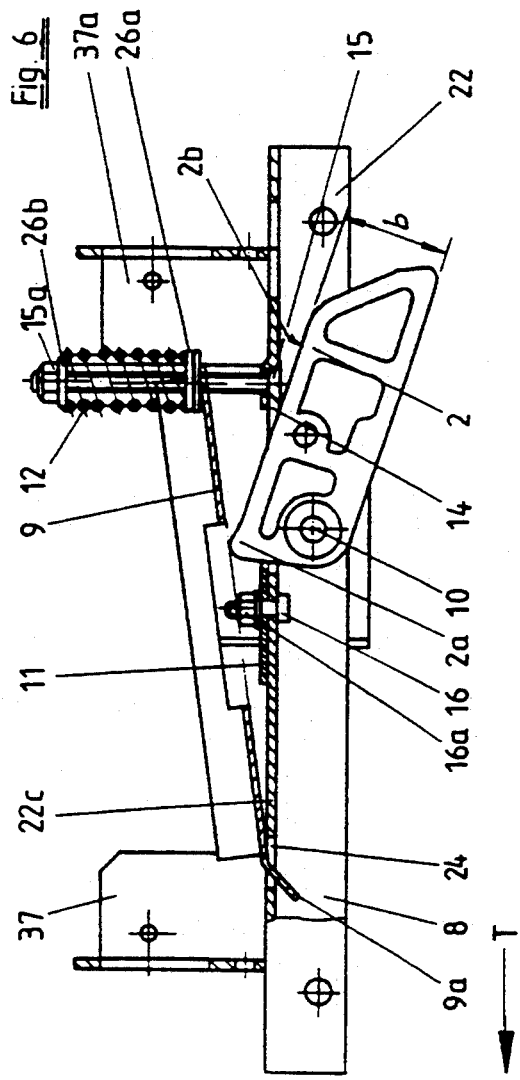
FIG. 6 shows the pusher of FIG. 3 with upward-swung claw.

The rear edge 2a of the claw 2 is rounded and protrudes so far over the rear surface 22c that a force in the counterclockwise direction will act on the rear edge 2a via the plate 9 if the claw 2 is swung so far upward that the edge 2a comes in front of the pivot point formed by the pin 10 (FIG. 6). This moment of force holds the claw 2 in its upraised third position and prevents it from swinging backward as a result of the force exerted by the weight of the claw 2.

A force causing the claw 2 to swing upward will result from a conveyor carriage 1 which is blocked in the region of the switch 19. The pusher 8 will accordingly be able to move over the rear roller 30 of the conveyor carriage 1 without being damaged.

Figure 2:
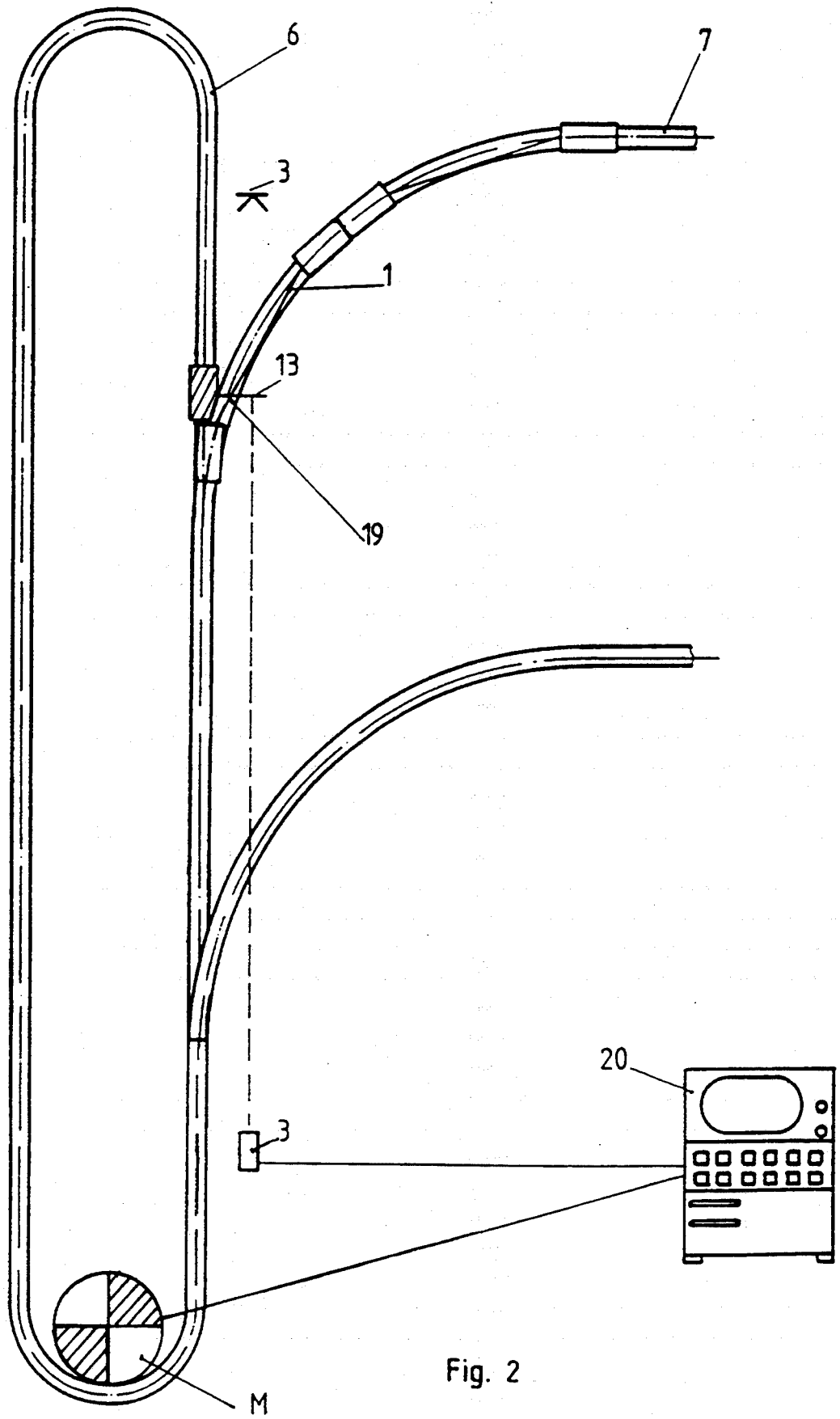
FIG. 2 shows schematically a main conveyor line and a secondary conveyor line which are connected together by a switch.

In the region of the switch 19, an optical monitoring device 3 is provided on the conveyor line 6. This monitoring device 3 can, for instance, be a laser or a traditional light barrier. In FIG. 2 a light barrier 3 consisting of a radiator and a reflector is diagrammatically shown. This monitoring device 3 is so oriented that it radiates past the drive elements 21 and the pushers 8. If, due to a blockage, the claw 2 swings up and the flap 13 thereby swings out, the beam of light of the monitoring device 3 is interrupted and it is thereby noted that a conveyor carriage 1 in the region of the switch 19 cannot be transported further. The monitoring device 3 is connected with the control unit 20 of the conveyor system. By the interruption of the beam of light, a signal is given to the control unit 20, serving immediately to stop the drive of the conveyor chain 5. Damage to the conveyor system is thereby effectively prevented.

The outwardly swung flap 13 subsequently helps maintenance personnel to discover the switch 19 by which the signal has been triggered.

Instead of an optical monitoring device 3, a microswitch can also be arranged in the vicinity of the switch 19 in such a manner that it is actuated by the outwardly swung flap 13. The stopping of the conveyor system is then effected by an electromechanical operation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An overhead conveyor system with rolling conveyor carriages guided on a main conveyor line, and a drive chain which revolves endlessly adjacent the main conveyor line in a direction of transport (T), the overhead conveyor system comprising:

at least one branch line and a switch for guiding conveyor carriages from the main line into the branch line; and a pusher which is fastened to the conveyor chain and arranged for urging conveyor carriages from the main line into the at least one branch line, the pusher including a carrier device and a claw which is fastened therein on a pivot for swinging in a vertical plane;

the claw having a first active position for engaging conveyor carriages; a second inactive position in which the claw is swung upward in the direction of transport (T) for permitting a conveyor carriage to pass the pusher device in the direction of transport; and a third position in which the claw is swingable in the direction opposite the direction of transport (T) by encountering a blocked conveyor carriage on the conveyor line, the pusher further comprising a spring resisting movement of the claw into the third position, and a recess above the pivot point of the claw, the recess being covered in the first and second positions of the claw by a spring-loaded plate, the plate being swingable upward by the claw swinging into the third position against the force of the spring.

2. An overhead conveyor system according to claim 1, wherein the pusher has a signal device arranged for being brought by the claw, when it is swung into the third position, from an inactive position into an active position, and in the active position the signal device serving as an indication that the claw has been swung into the third position.

3. An overhead conveyor system according to claim 2, wherein the pusher includes a horizontally swingable plate which supports the signal device, and a recess adjacent to the pivot point of the claw, wherein the plate extends over the recess in the active position of the claw.

4. An overhead conveyor system according to claim 3, wherein the plate has a nose which cooperates with the claw for activating the signal device when the claw swings into the third position.

5. An overhead conveyor system according to claim 2, further comprising an automated optical monitoring device which is arranged adjacent to the conveyor line for detecting the signal device in the active position.

6. An overhead conveyor system according to claim 5, wherein the signal device is a mechanical flap which is swingable outward from the pusher into its active position, and the optical monitoring device is arranged along the conveyor line and is directed for detecting the outwardly swung flap.

7. An overhead conveyor system according to claim 5, wherein the optical monitoring device is functionally connected with a control unit of the overhead conveyor system for sending the control unit a signal for causing the control unit to stop the conveyor chain when a signal device is detected.

8. An overhead conveyor system according to claim 5, wherein the optical monitoring device is set up parallel to the conveyor line for detecting the signal device in the active position.

9. An overhead conveyor system according to claim 2, wherein the signal device engages a switch for stopping the drive chain when the signal device is in the active position.

10. An overhead conveyor system with rolling conveyor carriages guided on a main conveyor line, and a drive chain which revolves endlessly adjacent the main conveyor line in a direction of transport (T), the overhead conveyor system comprising:

at least one branch line and a switch for guiding conveyor carriages from the main line into the branch line; and a pusher which is fastened to the conveyor chain and arranged for urging conveyor carriages from the main line into the at least one branch line, the pusher including a carrier device and a claw which is fastened therein on a pivot for swinging in a vertical plane;

the claw having a first active position for engaging conveyor carriages; a second inactive position in which the claw is swung upward in the direction of transport (T) for permitting a conveyor carriage to pass the pusher device in the direction of transport; and a third position in which the claw is swingable in the direction opposite the direction of transport (T) by encountering a blocked conveyor carriage on the conveyor line;

wherein the pusher has a signal flag arranged for being brought by the claw, when the claw is swung into the third position, from an inactive position into an active position substantially orthogonal to the direction of travel (T), and in the active position the signal flag serving as a visual indication that the claw has been swung into the third position.

11. An overhead conveyor system according to claim 10, further comprising an automated optical monitoring device which is arranged adjacent to the conveyor line for detecting the signal flag in the active position.

* * * * *